US006350199B1

(12) United States Patent
Williams et al.

(10) Patent No.: US 6,350,199 B1
(45) **Date of Patent: *Feb. 26, 2002**

(54) INTERACTIVE GAMING MACHINE AND METHOD WITH CUSTOMIZED GAME SCREEN PRESENTATION

(75) Inventors: James R. Williams; Timothy Gilbert, both of Reno, NV (US)

(73) Assignee: International Game Technology, Reno, NV (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/268,876

(22) Filed: Mar. 16, 1999

(51) Int. Cl.[7] .................................................. A63F 13/00
(52) U.S. Cl. ............................. 463/16; 463/31; 463/30
(58) Field of Search ............................. 463/16, 44, 20, 463/43, 31, 29, 30

(56) References Cited

U.S. PATENT DOCUMENTS

| | | | | | |
|---|---|---|---|---|---|
| 4,710,873 | A | * | 12/1987 | Breslow et al. | 364/410 |
| 5,038,022 | A | * | 8/1991 | Lucero | 235/380 |
| 5,179,517 | A | * | 1/1993 | Sabin et al. | 364/410 |
| 5,553,864 | A | * | 9/1996 | Sitrick | 463/31 |
| 5,649,861 | A | * | 7/1997 | Okano et al. | 463/30 |
| 5,674,128 | A | * | 10/1997 | Holch et al. | 463/42 |
| 5,692,205 | A | * | 11/1997 | Berry et al. | 395/788 |
| 5,764,226 | A | * | 6/1998 | Consolatti et al. | 345/333 |
| 5,795,228 | A | * | 8/1998 | Trumbull et al. | 463/42 |
| 5,800,269 | A | * | 9/1998 | Holch et al. | 463/42 |
| 5,810,665 | A | * | 9/1998 | Takemoto et al. | 463/31 |
| 5,830,065 | A | * | 11/1998 | Sitrick | 463/31 |
| 5,902,983 | A | * | 5/1999 | Crevelt et al. | 235/380 |
| 5,941,774 | A | * | 8/1999 | Takemoto et al. | 463/31 |
| 5,954,583 | A | * | 9/1999 | Green | 463/29 |
| 5,971,852 | A | * | 10/1999 | Itai et al. | 463/31 |
| 6,004,208 | A | * | 12/1999 | Takemoto et al. | 463/20 |
| 6,061,695 | A | * | 5/2000 | Slivka et al. | 707/513 |
| 6,089,982 | A | * | 7/2000 | Holch et al. | 463/42 |
| 6,167,353 | A | * | 12/2000 | Piernot et al. | 702/94 |

* cited by examiner

*Primary Examiner*—Lee Young
*Assistant Examiner*—Minh Trinh
(74) *Attorney, Agent, or Firm*—Beyer Weaver & Thomas

(57) ABSTRACT

A method and apparatus for an interactive video game to be displayed on a video display device. The gaming apparatus includes a game controller adapted to control the outcome of a game played on the gaming machine for display on the display device. A player interface is coupled to the gaming apparatus and is configured to input information data personally identifying a player operating the gaming machine. This personal identification data, such as a players name, birthdate, digitized facial pictures of player, etc., is then integrated into the game for integral display in the game outcome on the display device. Thus, player interaction is increased by customizing the game screen presentation to include their personal information.

10 Claims, 5 Drawing Sheets

INTERACTIVE GAMING MACHINE AND METHOD WITH CUSTOMIZED GAME SCREEN PRESENTATION

TECHNICAL FIELD

This present invention relates, generally, to gaming machines and, more particularly, relates to interactive gaming machines with personalized game screen presentations.

BACKGROUND ART

In the recent past, gaming machines have become increasingly sophisticated. The once traditional mechanically-driven reel slot machines are often replaced with electronic counterparts having CRT video displays or the like. Moreover, these video/electronic gaming advancements enable the operation of more complex gambling games which would not otherwise be possible on mechanical-driven wagering machines. Such stand alone video electronic games include Keno, Blackjack, Poker, Pai Gow, and all the variations thereof.

More recently, multiple game platforms have been developed which provide access to multiple electronic games through a single stand alone gaming machine, such as International Game Technology's (IGT) "Game King Machine". A game selection menu may be provided on the video display which offers the patron the choice of at least two video/electronic games. The gaming patron, thus, may select a wagering game of their choice without having to search the gaming establishment for the location of a desired game.

Not only have the play of the games increased in sophistication, but so have many other aspects of the game such as the methodologies and schemes employed to award a winning gaming patron, and the graphical presentations of the game. Collectively, these features have generally increased player interest, and thus increased revenue for the gaming establishments.

Another technique employed to increase player interest, as well as to distinguish a gaming establishments video games from those of their competitors, has been to customize the hardware and firmware for video gaming machines which reflect the gaming establishment. This is typically achieved by displaying custom card backs or the like for the cards illustrated in the game screen presentations. During play and non-play of the video gaming machine, for example, the graphical representations of the card backs often include the gaming establishments name and/or their associated logo on the card. Other forms of customized screen presentations may include special attract modes of other aspects of the game which are unique to a particular gaming establishment.

While these graphical customization techniques foster recognition of the video games with the gaming establishment, they generally lack the ability to encourage player interaction, and thus player interest. Accordingly, in view of the above observations, it would be desirable to provide a video gaming machine which increased player interaction.

DISCLOSURE OF INVENTION

The present invention relates to a gaming apparatus for an interactive video game to be displayed on a video display device. The gaming apparatus includes a game controller adapted to control the outcome of a game played on the gaming machine for display on the display device. A player interface is coupled to the gaming apparatus and is configured to input information data personally identifying a player operating the gaming machine. This personal identification data is then integrated into the game for integral display in the game outcome on the display device.

Accordingly, the game presentation is customized to include personal information relating to the player for display during play of the game. Such personal information may include the players name, age, birthdate, digitized facial pictures of player and/or of the players family, etc. Player interaction is substantially increased, which in turn, increases player interest.

The game controller preferably includes a first memory device containing data which provide video content associated with the game. A second memory device contains other data which provides video content associated with the personal identification data. Preferably, the first memory is a "video" EPROM, while the second memory is a "video" RAM for temporarily storing the personal identification data.

In one embodiment, the game may include a video figurine having a head portion with a blank face slot. In this face slot, the digitized picture data of the player's face may be inserted whenever the figurine appears in the game presentation during play of the game. Thus, during a card-game such as video electronic poker or video electronic blackjack, for example, the players face may be presented in the King face card.

In another embodiment, the player interface device is provided by a card reader for reading encoded personal identification data from a card, such as a SMARTCARD having a memory chip. Another player interface may include a keypad for allowing the player to key in information, or a network computer system electronically coupled to the game controller.

The present invention further includes a method of displaying video content on a gaming machine having a display device capable of presenting the outcome of a game played on the gaming machine. The method includes the steps of: inputting into the gaming machine personal identification data personally identifying a player operating the gaming machine; and generating on the gaming machine primary video content representing the outcome of the game. A further step includes integrating the personal identification data into the primary video content for simultaneous display of the personal identification data and the primary video content on the display device of the gaming machine.

In one arrangement, the inputting step includes the step of transferring the personal identification data into the gaming machine through a player interface device. This transferring step may include the step of reading the personal identification data into the card reader from a card.

The method of the present invention may further include the step of: storing data providing the primary video content associated with the game outcome in a first memory device; and storing data providing video content associated with the personal identification data in a second memory device. In another aspect, the integrating step further includes the steps of accessing the primary video content from the first memory device during play of the game, and accessing the personal identification data from the second memory device during play of the game for the simultaneous display on the display device.

BRIEF DESCRIPTION OF THE DRAWINGS

The method and assembly of the present invention has other features of advantage which will be more readily apparent from the following description of the Best Mode of Carrying Out the Invention and the appended claims, when taken in conjunction with the accompanying drawing, in which:

BEST MODE OF CARRYING OUT THE INVENTION

Figure 1:
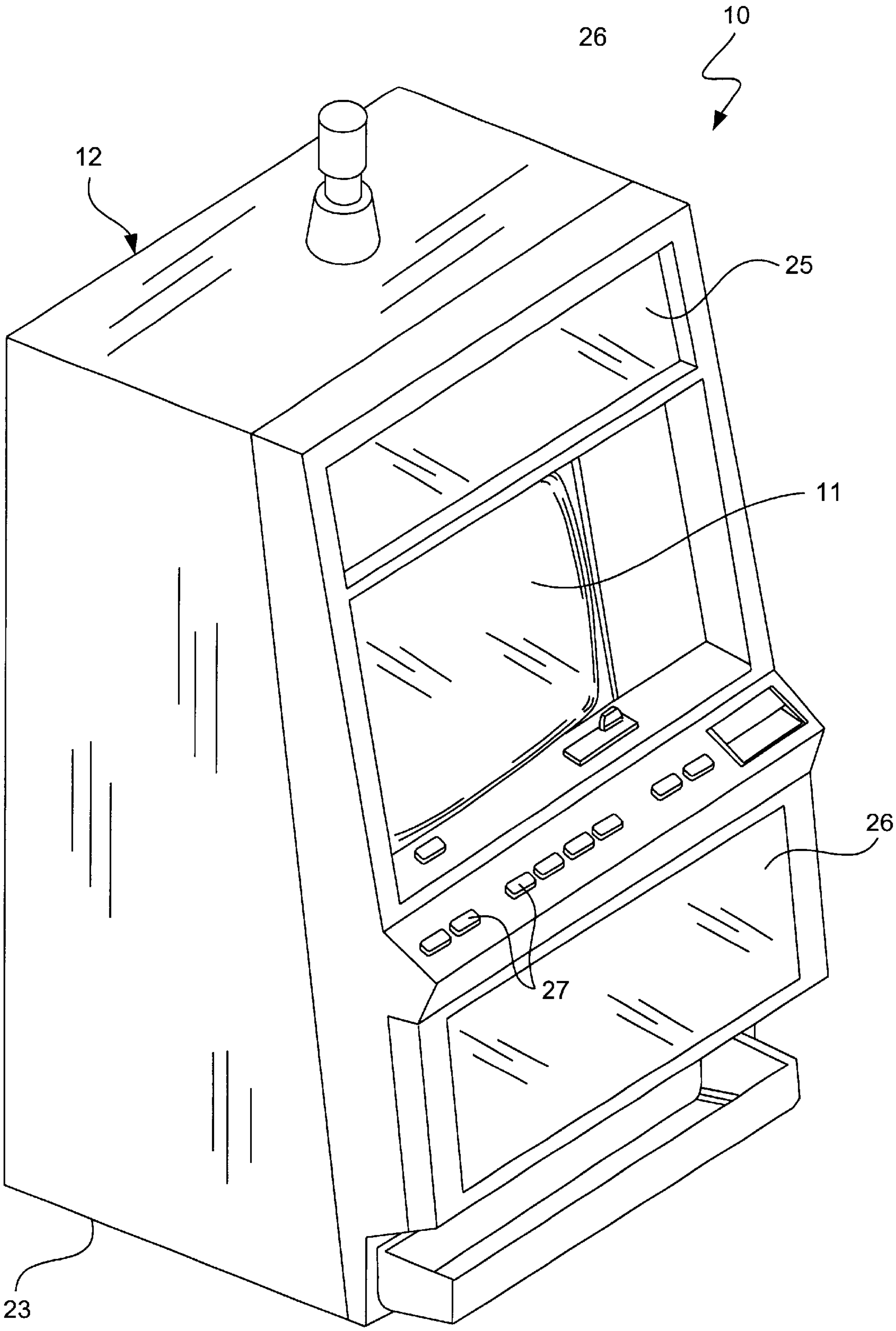
FIG. 1 is a top perspective view of a conventional gaming machine incorporating a user interactive gaming EPROM chip set designed in accordance with one embodiment of the present invention.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Figure 2:
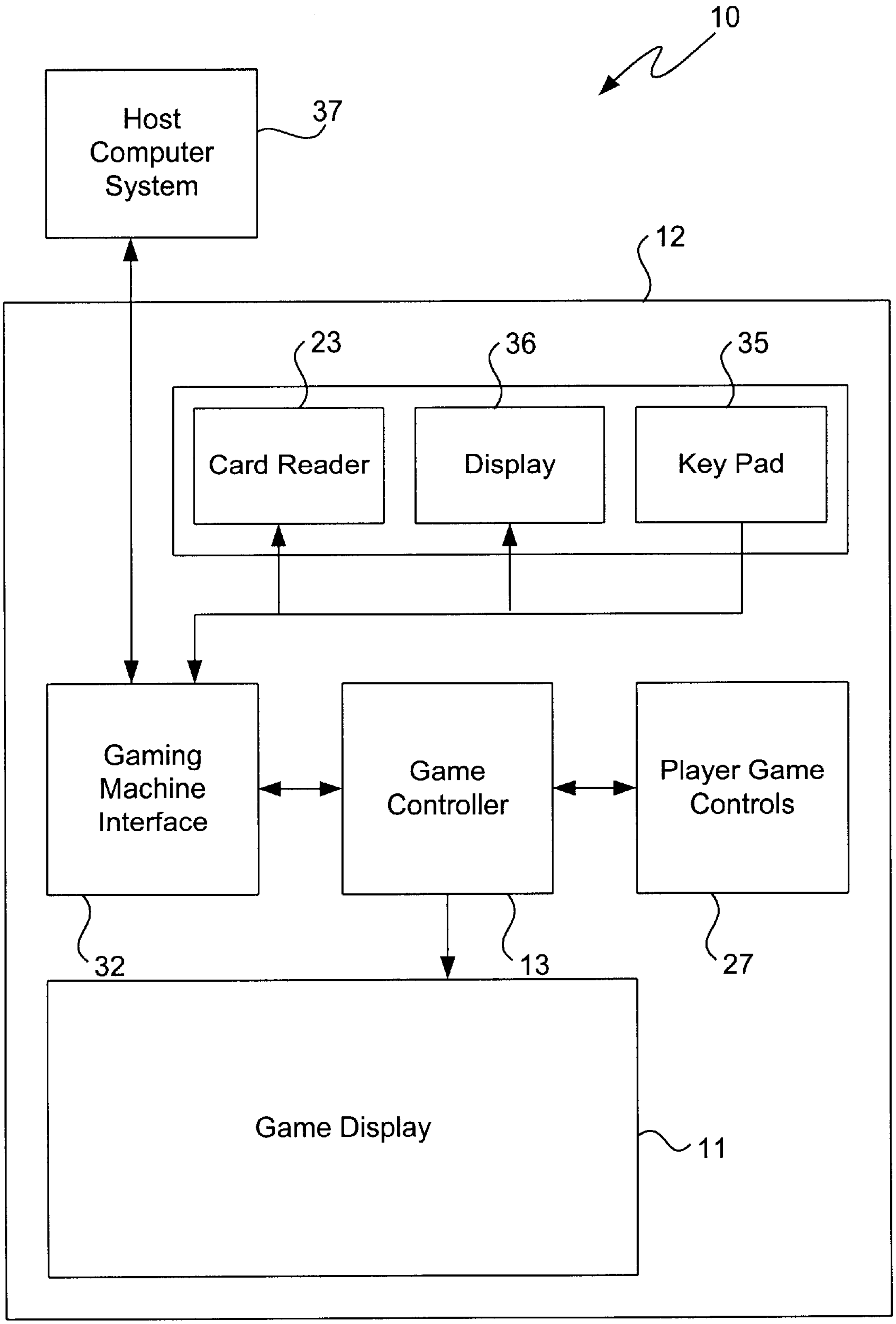
FIG. 2 is a schematic representation of a gaming machine incorporating the interactive gaming device with customized game screen presentation of the present invention.

Attention is now directed to FIGS. 1 and 2 where the present invention video device, generally designated 10, is illustrated which enables user interactive video game play by incorporating personal identification data of the user into the game screen presentation to be displayed on a video display device 11. Preferably, these video devices are in the form of gaming machines 12 provided at gaming establishments which are operably accessible from single or multiple game formats. However, the interactive video device and method of the present invention may also be used in connection with other video formats such as video games at arcades, electronic lottery machines or the like.

Referring now to FIG. 2, the gaming machine 12 includes a game controller, generally designated 13, adapted to control the outcome of a game played on the gaming machine 12 for display on the display device 11. A player interface, generally designated 15, is configured to input information data personally identifying a player operating the gaming machine 12. The interface 15 is connected to game controller 13 for integration of the personal identification data into the game for integral display in the game outcome (FIGS. 3, 4 and 5) on the display device 11.

In accordance with the present invention, personal identification data input through a player interface device will be incorporated into the game screen presentation in a manner described below. This information data preferably includes identification data such as the player's name, age, birthdate, height, weight, marital status, etc. which may be displayed in the form of text or text strings incorporated in the conventional graphics of the game. Moreover, full length digitized pictures or facial digitized pictures are preferably included in the information data for integral display in the games screen presentation. It will further be appreciated that such information data includes any other identity data relating to the player such as text and digitized pictures of family members, relationships, friends, pets, etc.

Accordingly, player interest is increased by personally involving the player in the game screen presentation. Such customization of the screen presentation allows the player to feel more "interactive" or an integral part of the game, and thus, enhances their entertainment value. Ultimately, this increased player interest will make the games more appealing.

Figure 3:
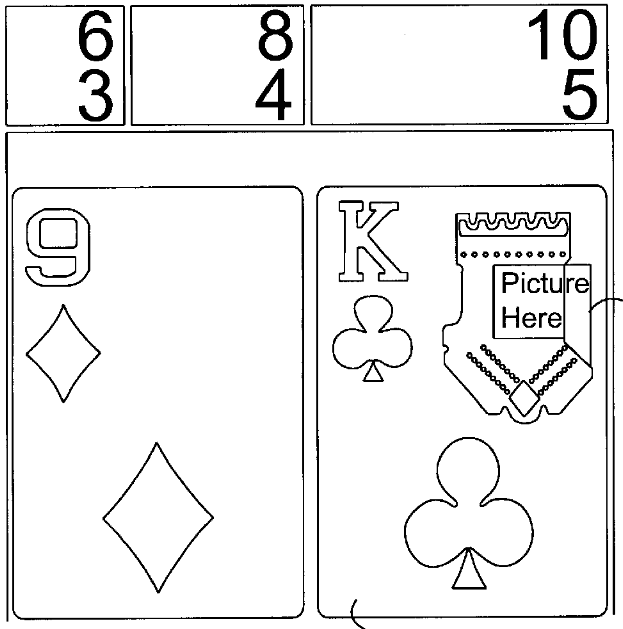
FIG. 3 is a representation of a King face card having a face slot for incorporating a digitized picture of the player in the face slot for presentation on the video display screen of the present invention.

As shown in fragmentary screen representation of FIG. 3, in an electronic cardgame such as Video Poker, Video Blackjack or Video Pai-Gow, the face cards may incorporate blank face slots 16 designated for digitized facial pictures of the player or the like which are included in the personal identification data. For example, whenever a King face card 17 is drawn during play of the game, the digitized picture of the player's face will be imposed in the blank face slot 16 for presentation on the video game screen. Consequently, the player directly observes his or her picture, name and/or other related identity information integrated into the game outcome. Substantially more interaction with the game is thus experienced as opposed to conventional video gaming devices.

Moreover, the remaining face cards in these cardgames may include other digitized facial pictures of persons socially or familiarly related to the player. For example, a digitized facial picture of a male player's spouse may be imposed in a blank face slot of a Queen face card (not shown), or a digitized facial picture of that player's father-in-law may be imposed in a blank face slot of a Joker card (not shown).

Figure 4:
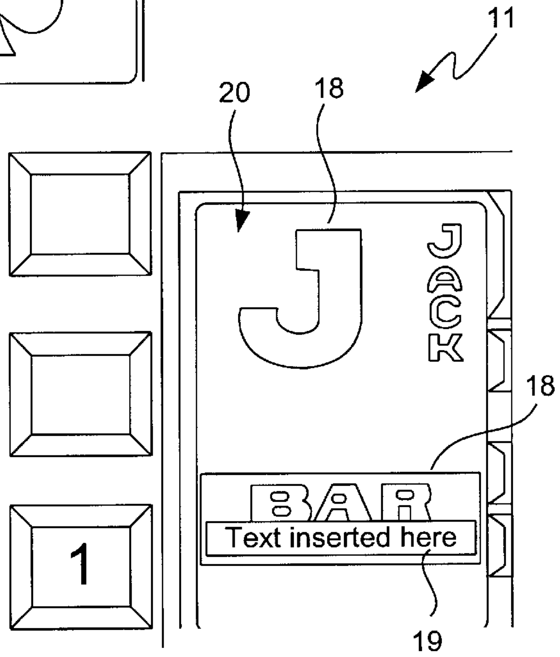
FIG. 4 is a representation of a Slot Reel Strip Symbol incorporating a text string for presentation on the video display screen of the present invention.

In another embodiment, a digitized picture data or a textual identification data of the personal identification data may be incorporated into selected symbols 18 of the plurality of symbols of each Slot Reel Strip 20 of a video Spinning Reel Game (FIG. 4). Using such information, a limitless number of text strings or the like may be formed with any combination of symbols. For example, as best illustrated in the fragmentary screen representation of FIG. 4, should a player named "Mr. Smith" be operating a gaming machine constructed in accordance with the present invention on their birthday, the text string "HAPPY BIRTHDAY MR. SMITH" may be incorporated below one or any "Bar" symbols 18 in a text slot 19 presented on the screen display. As another example, should a winning combination of symbols be aligned on the game screen representation of the spinning reel strips 20, the text string "CONGRATULATIONS MR. GILBERT" may be incorporated in the winning symbols.

Figure 5:
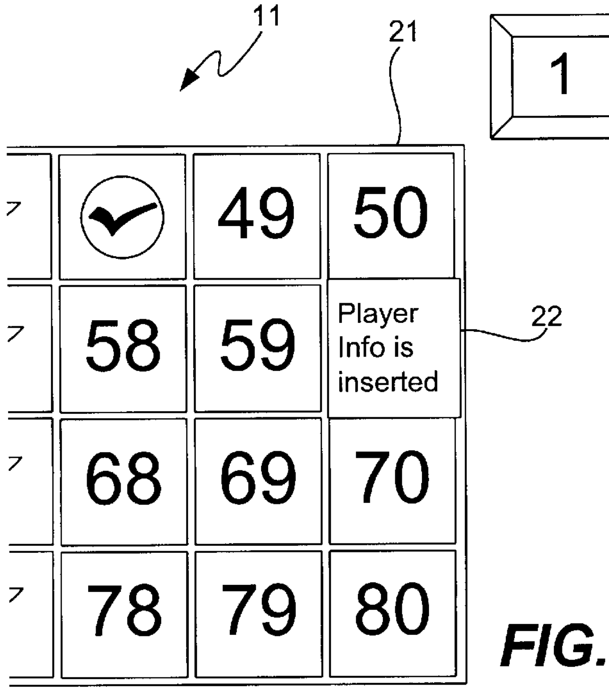
FIG. 5 is a representation of a Keno Game Card incorporating a text string for presentation on the video display screen of the present invention.

In yet another embodiment, as shown in the fragmentary screen representation of a Keno game card 21 in FIG. 5, one of the slots 22 normally reserved for a number on the Keno game card 21 may impose the player's digitized facial picture in the selected slot. Another example may be to replace all correctly drawn numbers with this digitized picture or a text string.

Briefly, the embodiments of the present invention as described above employ various operations involving data stored in computer systems or processors of video devices and encoder devices for example. Useful machines for performing the operations of this invention include digital computing systems or other data processing devices. Such apparatus may be specially constructed for the required purposes, or it may be a general purpose computing system selectively activated or reconfigured by a computer program stored in the computer. The processes presented herein are not inherently related to any particular computing system or other apparatus. In particular, various general purpose machines may be used with programs (including programmed EPROMs for example) written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; semiconductor memory, optical media such as CD-ROM disks; magneto-optical media such as optical disks; and hardware devices that are specially configured to store and perform program instructions, such as read-only memory devices (ROM) such as flash memory devices, EEPROMs, EPROMs, etc. and random access memory (RAM). Examples of program instructions include both machine code, such as produced by a compiler, and files containing higher level code that may be executed by the computer using an interpreter.

Briefly, referring back to FIG. 1, a conventional video display gaming machine 12 is provided in accordance with one embodiment of this invention which is capable of supporting a single game format or a multi-game format, such as International Game Technology's (IGT) "Game King Machine" or "Vision Series Machine". It will be appreciated, of course, that any other single or multi-game machine format may be employed as well. Gaming machine 12 may include a gaming machine housing 23, a top glass 25, a belly glass 26, and a video display device 11. Video display device 11 may be provided by high-resolution flat panel Liquid Crystal Displays (LCD), Cathode Ray Tubes (CRT), projection type LCDs, plasma displays, field emission displays, Digital Micromirror Devices (DMD) or other conventional electronically controlled video monitors Provided beneath video display device 11 are various play controls 27 which permit the user to control operation of and interact with the gaming machine in a conventional manner (E.g., card selection in video poker, play initiation in slot games, etc.) These controls may include, for example, control buttons, slot machine play handles, etc. located on an external surface of gaming machine 12. Other game control inputs may include a bill validator or other currency accepting apparatus which accepts currency and notifies the game controller 13 that credit for one or more game plays has been obtained. Of course, the arrangement and function of control buttons 27 will depend somewhat upon the type of game (or games) that can be played on machine 21, and buttons 38 may have more than one function depending on the available games.

FIG. 2 is a block diagram of the gaming machine 12 of FIG. 1 designed in accordance with this invention. Gaming machine 12 includes an internal game controller 13 which controls the operation of a gaming device such as a traditional slot game, a progressive slot game, a video poker game, a keno game, a blackjack game, a lottery game, a multi-line game (with 8 or 15 pay lines), etc. In this regard, the game controller 13 recognizes player inputs and provides players with options at appropriate junctures in a game. It also controls the outcome of that game (applying the necessary random components). Controller 13 also controls a game display device 11 which provides a graphical display (or mechanical display such as spinning reels) observed by a player while playing the game. The game controller 13 typically includes a processor 28 and associated memory 30, 31 (FIG. 6), firmware, and software as necessary for controlling the game play. Such game controllers are now widely used in electronic gaming machines available from companies such as International Game Technology of Reno, Nev. and Bally Gaming, Inc. of Las Vegas, Nev.

A gaming machine interface 32 (optional) may be bidirectionally coupled to the game controller 13. Preferably, this interface communicates with the game controller via a defined handshake protocol. The gaming machine interface 32 is also bidirectionally coupled to the player interface 15 for receipt of the personal identification data thereof, preferably through hardwiring or a Local Area Network (LAN) and/or a Wide Area Network (WAN). This interconnection will depend upon the type of player interface which will be discussed below. Thus, the machine interface 32 may contain the hardware and software and/or firmware necessary to allow processing of information from both the game controller 13 and the player interface 15. In the context of this invention, gaming machine interface 32 is specially programmed to communicate with such game controller 13 and player interface 15 such that electronic or optical signals, including the personal identification data, can be communicated between the player interface, the game controller and the gaming machine. The machine interface 32 can also receive and process information provided by game controller 13 regarding the progress of a game including any payouts to gaming machine interface 32.

Other functions of gaming machine interface 32 may include providing-player tracking information, security information, and accounting information from gaming machine 12 to a local area network in a casino or other establishment in which gaming machine 12 is located.

As illustrated in FIG. 2, the player interface 15 is coupled directly to gaming machine interface 32 to provide the mechanisms necessary for a player to input their personal identification data. In one embodiment, the player interface 15 preferably includes a card reader 33 configured to read encoded information on a debit card, credit card. Suitable card readers can be obtained from various vendors such as Panasonic Corporation of Japan and Peripheral Dynamics, Inc. of Plymouth Meeting, Pa., for example.

Suitable cards, on the other hand, typically include metallic strips or the like which contain the prerecorded identification information therein, such as the Player's name and address, etc. More preferably, conventional player tracking Slot Club Cards are utilized for the dual purpose of player tracking, and for providing the personal identification data. While these conventional plastic cards having metallic strips are adequate for storing limited amounts of text strings of the personal identification data, they do not currently have the capacity to store substantial amounts of data such that required for digitized pictures. Accordingly, SMART-CARDs having integral memory chips or the like may be employed to provide the necessary storage capacity. This system may also be adapted to accept any card issued by any institution where a player has an established account.

The player interface 15 may further include a key pad 35 to key in personal identification numbers (PINs) and any other information necessary to initiate and complete the input of information data. Preferably, though not necessarily, it is a DES encryption PIN pad available from such sources as International Verifact of Toronto, Canada, Verifone of Redwood City, Calif. A player interface display 36 may also be included which is preferably provided by a LED, LCD, vacuum fluorescent, or dot matrix alphanumeric display (having, e.g., a sixteen character, fourteen segment display) which displays information relevant to information data input. Such display information might include, for example, a prompt to enter a personal identification number or request input a spouses name, etc. Suitable displays may obtained from various vendors such as Futaba of Japan.

In an alternative embodiment, no gaming machine interface is used and the above-described functions of the gaming machine interface reside with the game controller 13. In this embodiment, the player interface 15 communicates directly with game controller 13, rather than with the machine interface 32 (not shown).

In another embodiment, the player interface 15 or game controller 13 may communicably cooperate with a host computer 37 coupled to the gaming machine 12 through the above-mentioned local area network (LAN) and/or a wide area network (WAN). In this manner, the same or related communication protocols and the same hardware and firmware to support the player tracking system could be utilized to store and transfer the personal identification data. During insertion of a players Slot Club Card or SMARTCARD used to track the players activities, in this embodiment, the personal identification data stored in the host computer 37 may be downloaded into the gaming machine 12. Similarly, if the player inputs their identity PIN numbers or the like in the key pad 35 of player interface 15, the host computer may be similarly contacted.

Referring back to FIG. 2, when a player begins play at a selected gaming machine 12, he or she may be prompted on one of the displays 11, 36 to insert their personal player's card into the card reader 33. It will be appreciated, however, that in the event a player does not have or has not be issued a player's card, the gaming machine may still be operated in a conventional manner without the integral screen presentation.

Upon insertion of the player's card into the card reader, in this embodiment, the encoded personal identification data is read from the magnetic strip or memory chip via the card reader 33. Before the identification information is transferred to the gaming machine through the gaming machine interface 32, however, it is necessary to validate the data for security purposes. This is performed by employing a Cyclical Redundancy (check CRC) algorithm to verify the identification data read from the card reader and before it can be transferred to the gaming machine. Any member of well known CRC algorithms can be used.

Figure 6:
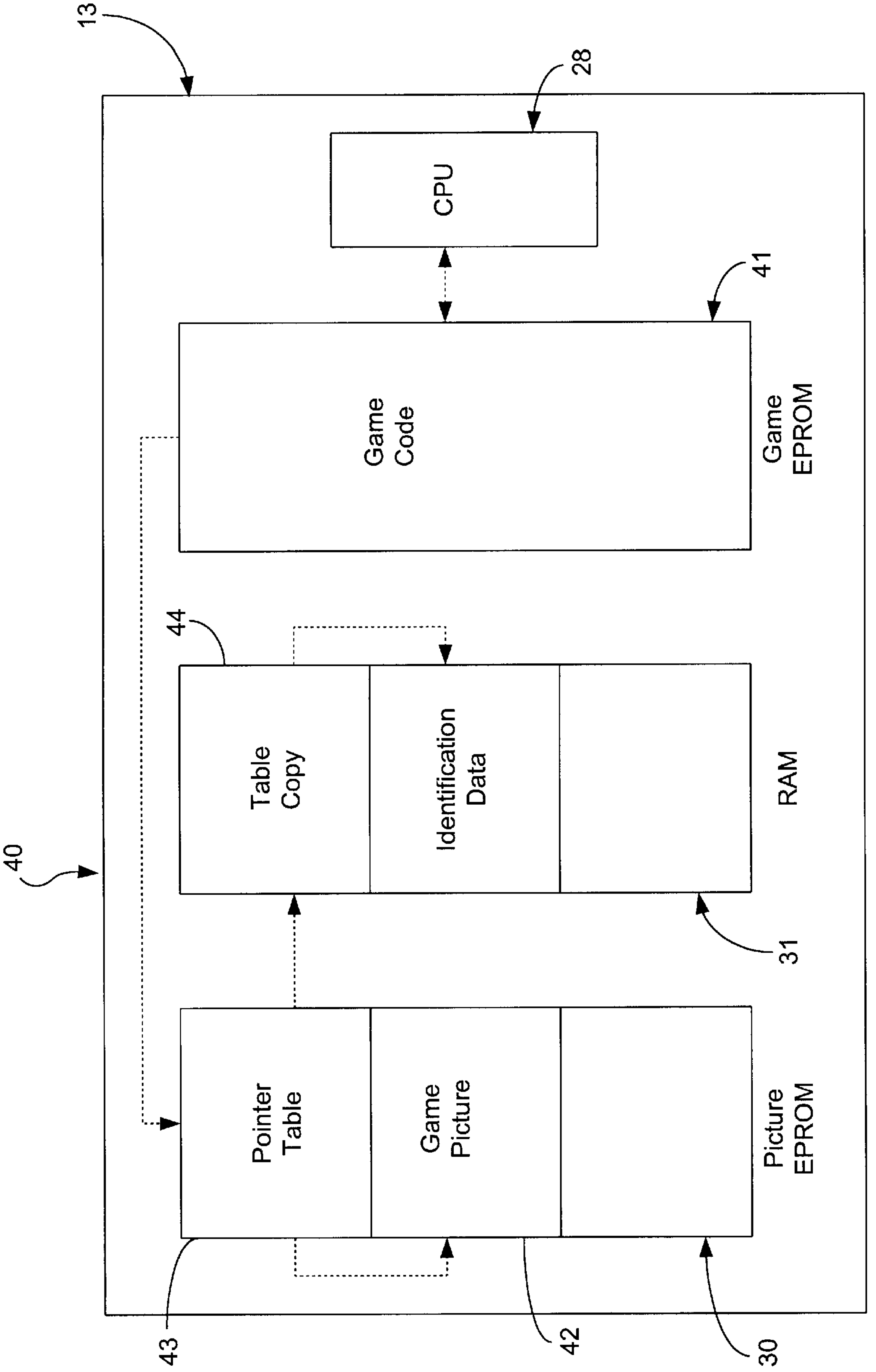
FIG. 6 is a schematic representation of the Picture EPROM and the Information Data non-volatile RAM communicating with the Game EPROM of the present invention.

Once properly validated, the personal identification data is transferred into the host gaming machine 12 through the gaming machine interface 32 and to the game controller 13. This information is then communicated to a non-volatile RAM 31 on a CPU board 40 of the game controller 13 for temporary storage thereof (FIG. 6). The gaming machine CPU board 40 is the primary component of the game controller 13 and includes the necessary processors 28 and memory 30, 31 to execute the coded instructions to operate the multitude of available games. The CPU board 40 also executes the coded instructions to impose and/or integrate the personal identification data into the outcome of the game for integral presentation on the video display. The processor 28 will, of course, act on these instructions sets to generate the appropriate commands such as accessing the appropriate memory devices for access and integration of the appropriate personal identification data into the outcome of the game.

In accordance with a preferred embodiment of the present invention, the electronic gaming instructions are generally provided on an EPROM chip set configured to be compatibly and removably installed into gaming machine 12. Preferably, each chip set includes a set of game chips or game EPROM 41 (FIG. 6) which provide the specific information to operate the available games for display and operation on the gaming machine. Thus, these memory chips will further incorporate the instruction sets and graphics necessary for game operation of each game of a single or multiple game format, as well as incorporate the instructions sets to integrate the personal identification data supplied from an external source into the outcome of the game.

Briefly, it will be appreciated that the technique employed to incorporate the personal identification data into the game screen display as part of the game outcome is usually dependent upon the specific architecture of the gaming machine itself. Thus, a plurality of data integration techniques may be employed, depending upon the type of gaming device, without departing from the true spirit and nature of the present invention.

In the preferred embodiment, however, the present invention employs data structure techniques as a method of organizing the picture data from the game EPROM 41 for access thereof Picture data is organized into picture data structures. These data structures are stored in Picture EPROM 30. One of these structures is illustrated in FIG. 6 as Game Picture 42. The game code accesses picture data through a table of pointers (43) in the Picture EPROM. Each of these pointers in the table point to a picture data structure, such as Game Picture 42. Thus, when the game EPROM 41 and the CPU 28 draw a collective picture for display on the video display 11, during operation and execution of a game, selected game pictures 42 (which includes text) are referenced by game code or instruction sets in the game EPROM through the pointers to the picture data structures.

To replace an existing game picture 42, however, with personal identification data transferred in from the player interface 32, a picture table entry must be changed. This is preferably performed by replacing a pointer corresponding to the selected game picture in the pointer table 43 with a pointer corresponding to the transferred selected picture, as the personal identification data is stored using the same picture data structure as that used to store the corresponding game pictures to be replaced.

However, in this arrangement, since the pointer table 43 is contained in EPROM space, the entries cannot be changed or altered. The pointer table 43, in the picture EPROM 30 is therefore copied to a table copy 44 in the non-volatile RAM 31 where the table copy can be modified. Once the pointer table 43 is copied to table copy 44 in the RAM 31, it can modified so that the appropriate pointer entry now references the transferred picture. Subsequently, when the game code references the pointer table entries, the modified entry of the table copy 44 will be accessed and display the transferred personal identification data in the outcome of the game.

Briefly, the picture replacement may be cancelled by copying the original pointer table from EPROM to RAM. Essentially, this overwrites the modified table.

In an alternative configuration to personal identification data integration, flash memory (not shown) may be employed to store the game pictures 42 rather than the picture EPROM 30. Since flash memory is capable of being modified, the personal identification data transferred in from the player interface 15 can also be stored in flash memory together with the game pictures from the game EPROM 41.

A master copy of the unaltered pointer table is saved in either the flash memory or EPROM. This copy is used to modify and place in the appropriate flash memory location, where game code uses the pointer table to reference all game pictures. Hence, to use transferred identification data to replace an existing, selected game picture, the corresponding pointer entry to the game picture is replaced in the table with a pointer corresponding to the transferred identification data. This modified table is then written to the appropriate location in flash memory.

Similar to the picture EPROM, the unaltered master copy of the pointer table may be used to overwrite the modified table in the flash memory to cancel the modification.

From the above description, a method of displaying video content on a gaming machine is apparent having a display device 11 capable of presenting the outcome of a game played on the gaming machine 12. The method includes the steps of: inputting into the gaming machine 12 personal identification data personally identifying a player operating the gaming machine 12; and generating on the gaming machine 12 primary video content representing the outcome of the game on. A further step includes integrating the personal identification data into the primary video content for simultaneous display of the personal identification data and the primary video content on the display device of the gaming machine 12.

Figure 7:
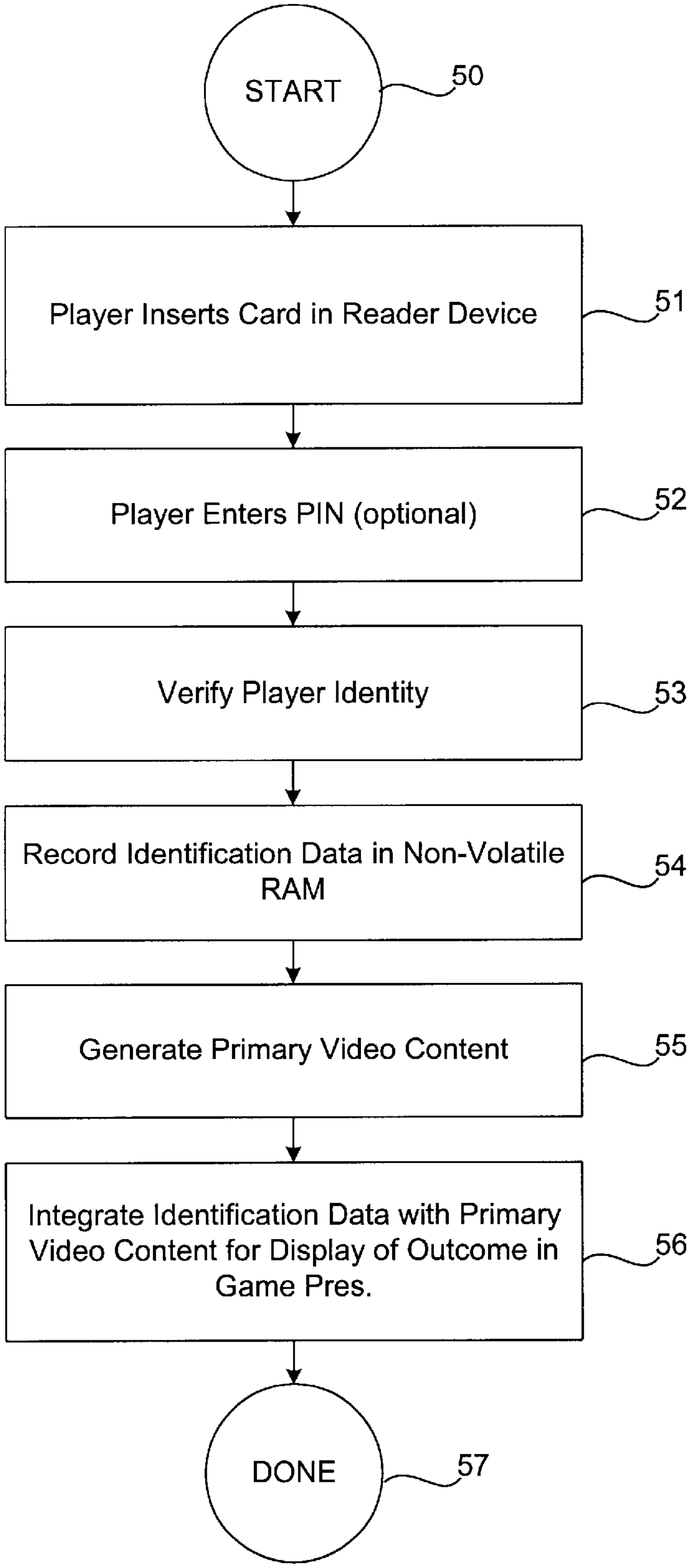
FIG. 7 is a process flow diagram illustrating the steps employed in customizing the game screen presentation in accordance with the present invention.

More particularly, FIG. 7 illustrates the process by which a gaming machine and associated electronics are used to display the outcome of a game played on the gaming machine 12 in accordance with this invention. The process begins at 50 and then, in a step 51, a gaming machine 12 detects that a player has inserted his or her credit or debit card into a reader device (the player interface 15). Next, in a step 52, the gaming machine detects that the player has entered his or her PIN on the key pad 35. The system then encrypts that PIN and uses it to verify that the card matches the PIN. Step 52 may be optional, as PINs are often not provided with credit cards. Further, the debit or credit card itself may be replaced with some other identification/verification indicia such as a keypad or a SMARTCARD. SMARTCARDs generally describe cards having a computer processor for use in a secure payment system. In such systems, a PIN will be unnecessary.

After the PIN has been entered and the identification verified, at step 53 the personal identification data is transferred from the card reader 33 to the gaming machine 12 through the gaming machine interface. At step 54, the identification data is recorded in non-volatile RAM 31 located on the CPU board 40 for access thereto by the Game EPROM 41 and CPU 28.

During operation of the game by the player, at step 55, the game controller generates primary video content representing the outcome of the game. At this step, the gaming machine operates in a conventional manner, cooperating with a Picture EPROM 30 to facilitate picture production on the display device 11. For example, when the game instruction sets, executed on the CPU 28, requires that a picture be drawn, the CPU references those pictures through a picture table 42 which contains an entry for each picture in the Picture EPROM 30.

The next step 56 includes integrating the personal identification data into the primary video content for simultaneous display of the personal identification data and the primary video content on the display device 11 of the gaming machine 12. Thus, to replace a game picture or text string, stored in the Picture EPROM, with the corresponding personal identification data, stored in the non-volatile RAM, a Picture Table entry must be changed. Since the Picture Table is in EPROM and cannot be changed, the imposed identification data needs to be copied to the RAM 31 and referenced by the game instruction sets there.

Accordingly, the integrating step 56 further includes the steps of accessing the primary video content from the Picture EPROM 30 during play of the game, and accessing the personal identification data from the RAM 31 device during play of the game for the simultaneous display on the display device 11. The process is repeated for the next screen display or done at step 57.

What is claimed is:

1. A gaming machine for an interactive video game to be displayed on a video display device comprising:

a game controller adapted to control the outcome of a game played on said gaming machine for display on said display device, said game including a video figure having a face slot;

a player interface configured to input digital picture data of the player's face operating the gaming machine; and an integrating device connected to the game controller and the player interface, and configured to integrate the digital picture data into the face slot of the video figure for integral display in the game on said display device.

2. The gaming machine as defined in claim 1 wherein, said game controller includes a first memory device containing data providing video content associated with the game, and a second memory device containing data providing video content associated with the digital picture data.

3. The gaming machine as defined in claim 2 wherein, said first memory is provided by a video EPROM.

4. The gaming machine as defined in claim 2 wherein, said second memory is provided by a video RAM for temporarily storing the digital picture data.

5. The gaming machine as defined in claim 1 wherein, said game is a video cardgame.

6. The gaming machine as defined in claim 5 wherein, said game is selected from the group of a video electronic poker and video electronic blackjack.

7. The gaming machine as defined in claim 1 wherein, said player interface device includes a card reader for reading encoded personal identification data from a card.

8. The gaming machine as defined in claim 7 wherein, said card is a SMARTCARD having a memory chip.

9. The gaming machine as defined in claim 7 wherein, said player interface device includes a keypad for allowing the player to key in information.

10. The gaming machine as defined in claim 1 wherein, said player interface device further includes a player tracking device.

* * * * *